[22.]

Chas. A. French.     Piano Truck.

119,025.     Patented Sep. 19, 1871.

Witnesses:
Charles French
Frank J. French

Inventor.
Chas A French 119,025

UNITED STATES PATENT OFFICE.

CHARLES ALBERT FRENCH, OF DAVENPORT, IOWA.

IMPROVEMENT IN PIANO-TRUCKS.

Specification forming part of Letters Patent No. 119,025, dated September 19, 1871; antedated August 28, 1871.

*To all whom it may concern:*

Be it known that I, CHARLES ALBERT FRENCH, of Davenport, in the county of Scott and State of Iowa, have invented certain Improvements in Piano-Trucks, of which the following is a specification:

The first part of my invention relates to the adjusting of piano-trucks in such a manner that the said trucks can be used to run pianos or heavy goods up or down stairs; the object of this part of my invention being to have the trucks constructed in such a manner that the distance between the two axles of said trucks can be shortened to correspond to the variation of the grade or run of the different stairs. The second part of my invention relates to the combination of screws and hooks or bolts to fasten either or both trucks to the bed at any place in the length thereof. The third part of my invention consists in having the piano rest on bearings near the end of the bed and one truck in or near the middle of the bed, so that the spring of the bed will deaden the jar arising from running the piano around on floors or sidewalks; the other truck may be left at the heavy end, thus answering for legs to keep the trucks erect when at rest; or it may be detached altogether.

Figure 1:
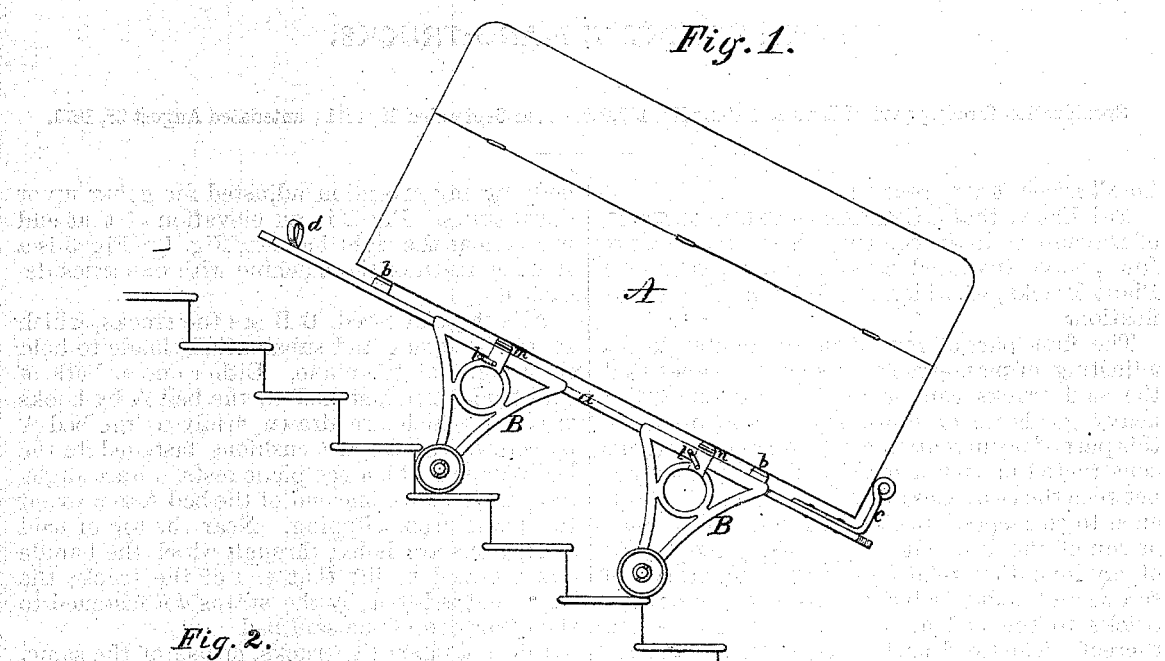
Figure 2:
Figure 3:
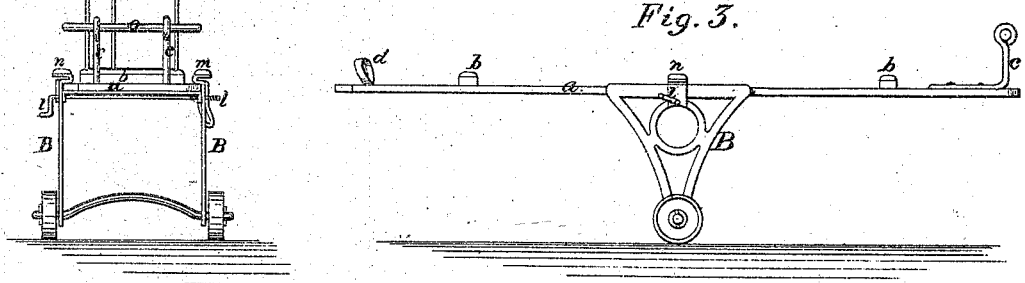

Figure 1 is a side elevation of a machine embodying my invention adjusted for going up or down stairs. Fig. 2 is an elevation of that end which is at the right hand in Fig. 1. Fig. 3 is a side elevation of the machine with one truck detached.

A is the piano-bed, B B are the trucks, which should be strong and substantially made to hold the weight of the piano. Either one or both of said trucks are fastened to the bed A by hooks $m\ m\ n\ n$, which are drawn firmly to the bed A by screws $l\ l$. $b\ b$ are cushions fastened to the bed A, upon which the piano rests. $c\ c$ are angle-irons fastened to one end of the bed A to prevent the piano from slipping. Near the top of said angle-irons are holes, through which the handle $o$ is inserted to lift that end of the truck; the other end is lifted by the straps $d\ d$ fastened to the other end of the said bed.

I do not claim the trucks, or use of the same, for moving pianos.

I claim as my invention—

The adjustable and detachable truck or trucks B B, substantially as and for the purpose hereinbefore set forth.

CHARLES ALBERT FRENCH.

Witnesses:
CHARLES FRENCH,
F. J. FRENCH.